United States Patent [19]
Orkin et al.

[11] 3,709,573
[45] Jan. 9, 1973

[54] SPLIT-RACE BEARING CONSTRUCTION

[75] Inventors: Stanley S. Orkin, Rockville; Richard W. Hartwick, Granby, both of Conn.

[73] Assignee: Kacarb Products Corporation, Bloomfield, Conn.

[22] Filed: Sept. 10, 1970

[21] Appl. No.: 71,223

Related U.S. Application Data

[62] Division of Ser. No. 800,143, Feb. 18, 1969, Pat. No. 3,578,828.

[52] U.S. Cl. ................................................308/161
[51] Int. Cl. .............................................F16c 17/00
[58] Field of Search.............................308/121, 161

[56] References Cited

FOREIGN PATENTS OR APPLICATIONS 1,375,158  9/1964  France .................................308/161

*Primary Examiner*—Milton Kaufman
*Assistant Examiner*—Frank Susko
*Attorney*—Cushman, Darby & Cushman

[57]  ABSTRACT

A dry, self-lubricating bearing comprises an outer and an inner race with coengaging bearing surfaces with the bearing surfaces on one race being made of a solid lubricant material and the bearing surfaces on the other race being made of a hardened material such as a thin ceramic coating on a metal substrate. In one embodiment, the outer race comprises a single member while the inner race comprises two separate members slidably carried within opposed seats of the outer race with the bearing being capable of absorbing radial, axial and moment loading individually or in combination. In other embodiments, the outer race is split comprising two members and/or the outer race is carried within concave seats of the inner race.

2 Claims, 11 Drawing Figures

SPLIT-RACE BEARING CONSTRUCTION

This is a division of application Ser. No. 800,143, filed Feb. 18, 1969, now U.S. Pat. No. 3,578,828, issued May 18, 1971.

BRIEF DESCRIPTION OF THE INVENTION

This invention relates to bearings and, in particular, to dry, self-lubricating bearings capable of absorbing radial, axial and moment loading individually or in combination.

A principal object of the present invention is to provide a bearing which is self-lubricating and therefore does not require periodic or continuous lubrication from an external source.

Another object of the present invention is to provide a durable, self-lubricating bearing capable of absorbing radial, axial and moment loading individually or in combination without binding and with minimum wear.

A further object of this invention is to provide a bearing construction of the foregoing character capable of operating over a wide temperature range.

A further object of the invention is to provide a bearing construction of the foregoing character having the unitary race of carbon-lubricating material and the split race with the ceramic coating on the metal substrate thereby eliminating the difficulty in fabrication which arises when the lubricating races of relatively brittle carbon material are made too thin and enabling the fabrication of bearings of much narrower configurations than possible when making bearing with split races of carbon material.

A still further object of the invention is to provide a bearing construction of the foregoing character having a split outer race, as well as a split inner race, when elongated sleeve bearings are required and there is no need to utilize the unitary outer race construction to facilitate the fabrication of the outer race from carbon material.

In a first embodiment, the bearing of the present invention comprises a unitary outer race having opposed inwardly facing bearing surfaces made of a solid lubricant material and a split inner race of two metal members having hardened bearing surfaces preferably coated with a ceramic or the like. In other embodiments, the outer race, as well as the inner race, is split and the members of the outer race are separated a desired distance by a spacer.

The coengaging bearing surfaces of the inner and outer races are adapted to slide relative to one another, are complementary in configuration and have respective concave and convex, spherical or conical curvatures to enable the bearing to absorb radial, axial and/or moment loading. Preferably, the solid lubricant material of the outer race is a carbonaceous material, a polymeric material or a polytetrafluoroethylene fabric and the long-wearing ceramic coating on the inner race is sufficiently thin, less than 0.010 of an inch, that it may deform under load and transfer stresses to the metal substrate, thereby reducing the possibility of fracturing the coating and giving the inner race a high load capacity.

The above objects and advantages will become more apparent and other objects and advantages of the present invention will become apparent from the following detailed description when taken in conjunction with the drawings in which.

Figure 10:
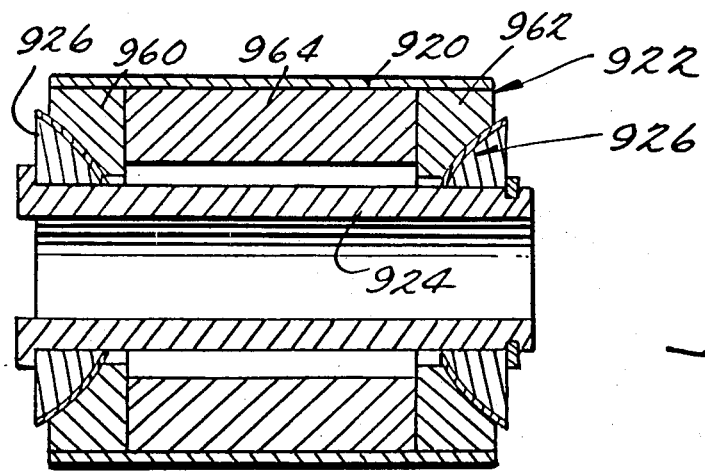
Figure 11:
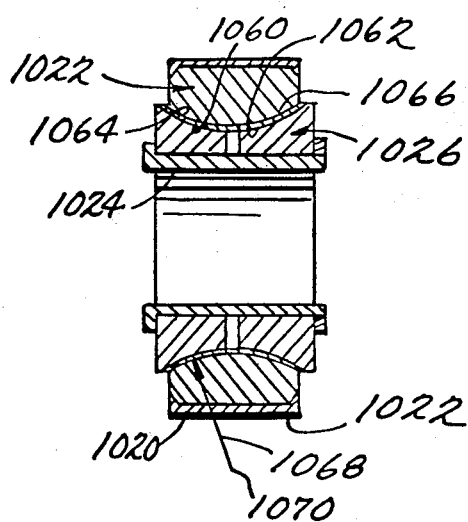

FIG. 10 is a sectional view of a bearing construction illustrating a tenth embodiment of the present invention wherein the outer race is split and the outer race members are separated by a spacer; and FIG. 11 is a sectional view of a bearing construction illustrating an eleventh embodiment of the present invention wherein the outer race has convex bearing surfaces and the inner race has concave bearing surfaces.

DETAILED DESCRIPTION OF THE INVENTION

The bearing assembly of this invention is of the type which oscillates and/or rotates in one plane only and is capable of absorbing radial, axial and moment loading individually or in combination. It comprises two bearing members having coengaging surfaces made respectively from solid lubricant and hardened or ceramic materials which slide rather than roll relative to one another.

Figure 5:
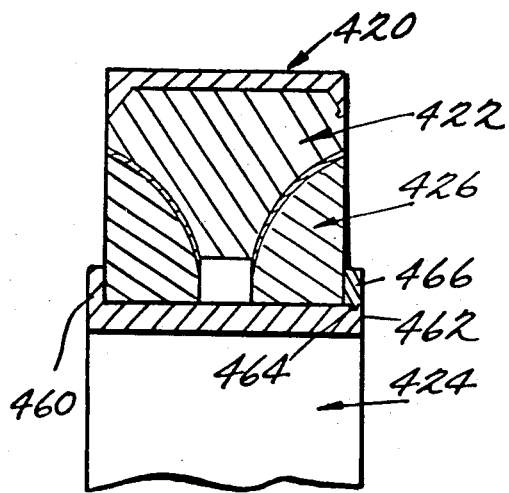
FIG. 5 is a fragmentary sectional view of the upper half of a bearing construction illustrating a fifth embodiment of the present invention having an inner race through bushing with one shoulder formed from a malleable material.
Figure 6:
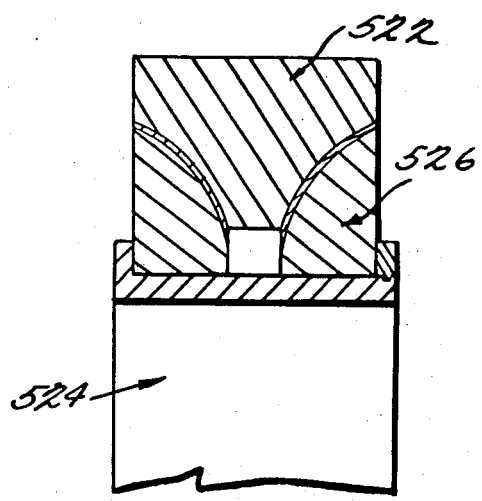
FIG. 6 is a fragmentary sectional view of the upper half of a bearing construction illustrating a sixth embodiment of the present invention wherein no outer race housing is required.
Figure 7:
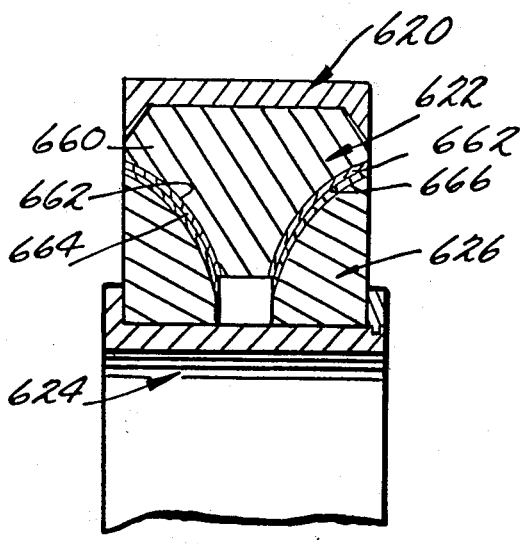
FIG. 7 is a fragmentary sectional view of the upper half of a bearing construction illustrating a seventh embodiment of the present invention wherein self-lubricating liners are bonded to the outer race to form the bearing surfaces.

The solid lubricant surfaces can be provided by relatively massive bodies of material having inherent lubricity, as illustrated in FIGS. 1 to 6 and 8 to 11, or by a layer of material having inherent lubricity that is supported on a backing material as shown in FIG. 7. In the preferred form, the solid lubricant surface is provided by a massive body of solid lubricant consisting largely of carbonaceous material as, for example, a body made solely of a compacted mixture of amorphous carbon and graphite or a body made of a compacted mixture of amorphous carbon and graphite impregnated with a metal or other material, such as silver or antimony, or liners of polytetrafluoroethylene fiber-woven fabrics, polymeric materials and the like. The ceramic surface, in the preferred form, is provided by a thin coating of ceramic material deposited or otherwise applied to a metal substrate of the inner race. The metal substrate is preferably one having a relatively high tensile strength in comparison to that of the ceramic and a high resistance to corrosion such as titanium, a titanium-based alloy, a ferrous alloy, such as stainless steel, aluminum or an aluminum alloy. The combination of the ceramic and solid lubricant surfaces results in a dry bearing utilizing the inherent lubricity of the solid lubricant material and requiring no additional lubricant.

The high wear resistance of the ceramic material reduces wear of the bearing parts and enables the parts to maintain their initial shapes and dimensions over a long service life. In addition, the use of a thin ceramic coating on the metal substrate reduces the occurrence of fractures and other damage normally associated with the use of ceramic material, due to its relatively low tensile strength, since the higher strength metal substrate serves to carry the major portion of the tensile loads. That is, the high strength property of the substrate material is combined to the low wear property of the ceramic material to produce a bearing having both low wear and high load carrying capabilities.

To achieve this result, it has been found that the ceramic coating must be sufficiently thin to permit a slight deformation thereof without fracturing so that stresses which would normally build up within the coating can be transferred to the substrate which has the greater tensile strength. Furthermore, the tensile strength of the substrate must be within a particular range. If the tensile strength is too low, the substrate will not provide proper support for the coating with the resulting deformation of the substrate under load thereby causing fractures in the ceramic coating. If the tensile strength of a substrate is too high, the substrate will not provide a proper cushioning effect, surface stresses will not be transferred to the substrate and the coating will fracture or otherwise fail as a result of such stresses. In particular, it is found that the tensile strength of the substrate should lie within the range of 35,000 to 250,000 psi to achieve a proper balance between the tendency of the coating to fracture as a result of deformation and the tendency of the coating to fracture as a result of surface stresses. Also, the coating must have a thickness ranging between 0.0005 to 0.010 inches with a thickness of approximately 0.004 being preferred.

It has been found that the use of titanium or a titanium-based alloy as a substrate material is particularly desirable insofar as this metal provides an especially good bond with the ceramic coating. In addition, this substrate material is more chemically inert than most materials which can be used, is light in weight and maintains its strength when subjected to relatively high temperatures approaching 800°F. Also, and perhaps most important, it has a coefficient of thermal expansion substantially equal to that of the various coating materials which may be used for the ceramic coating and, therefore, little or no stresses are built up on the coating as a result of differential expansion of the substrates and the coating when operating over a wide temperature range.

The material of the ceramic coating used on the substrate may vary widely. However, it has been found that coating materials made up predominantly of one or the other of five specific base compounds provide particularly good results, especially in combination with a substrate of titanium or a titanium-based alloy such as alloys which, in addition to titanium, comprise 5 percent by weight of aluminum and 2.5 percent by weight of tin (Ti-5Al-2.5Sn) or 6 percent by weight aluminum and 4 percent by weight of vanadium (Ti-6Al-4V). The five base compounds preferred for the coating materials are: chromium oxide ($Cr_2O_3$), titanium dioxide ($TiO_2$), aluminum oxide ($Al_2O_3$), titanium carbide (TiC), and tungsten carbide (WC). Each of these compounds may be used in substantially pure form or in combination with other additives intended to produce a more desirable coating or to facilitate the application of the coating to the substrate. Examples of the mixtures which may be used are (80% $Cr_2O_3$ + 20% NiCr), (TiC + 5–20% Ni), (50% WC + 35% NiCr + 15% NiAl), and (WC + 9% Co) where NiCr is made up of 80% Ni and 20% Cr and wherein the percentages given are volume percentages.

As an alternative to the use of a ceramic coating on the inner race bearing surface, the inner race bearing surface can be hardened by a conversion coating technique for titanium wherein the titanium is treated in a lithium carbonate bath solution when heat treated to 1,475°F. Also, steel alloy materials can be treated by nitriding processes (e.g., tuftriding) and carbonizing methods resulting in extremely hard bearing surface for the split inner race.

Figure 1:
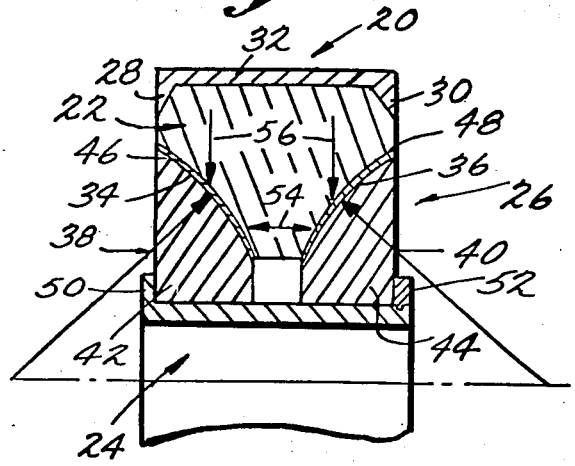
FIG. 1 is a fragmentary sectional view of the upper half of a bearing construction illustrating a first embodiment of the present invention having a steel outer race housing encasing a solid lubricant material and showing the center of curvature for generating the spherical bearing surfaces of the inner and outer races.

Referring now to the figures and, specifically to FIG. 1, a first embodiment of the invention is illustrated wherein the bearing construction comprises an outer race housing 20, an outer race 22, an inner race through bushing 24 and a split inner race 26. Outer race housing 20 is an annular member made of steel or some other suitable material and is channel-shaped in transverse axial cross section having two inwardly extending annular shoulders or flanges 28, 30 joined by a web 32. The outer race 22 is mounted within housing 20 in a manner to prevent relative movement between the two parts. This can be achieved by press fitting the outer race into the housing 20 and then upsetting the ends of web 32 to form shoulders 28, 30 which engage the end faces of the outer race. Of course, it is contemplated that the outer race 22 can be mounted within housing 20 by other methods such as bonding and the like if desired. With this construction, it can readily be seen that the bearing construction of the present invention can be packaged as an integral, self-contained component for ready installation in mechanical hardware with the component being retained in place by standard methods such as the staking of the housing, snap-rings, adhesive bonding and the like.

The outer race 22 consists of a solid-lubricating medium, preferably amorphous carbon and graphite impregnated with metallic silver, and is an annular member with an outer surface which is complementary to the inner surface of housing 20. Of course, it is contemplated that the outer race, solid, self-lubricating material can also be composed of various other compounds such as polymers or carbonaceous materials, polymers or carbonaceous materials filled with metallics or lubricants, and metallic composites impregnated or infiltrated with lubricating medium. The inner side of the outer race 22 is provided with a pair of separate opposed annular bearing surfaces or seats 34, 36 having concave spherical curvatures which cooperate with the inner race 26 to permit relative sliding movement between the inner and outer races even though the bearing is subjected to radial, axial and moment loading individually or in combination.

The split inner race 26 comprises two annular members 38, 40. These annular members are formed with hardened metal or with metal substrates coated with a ceramic material as disclosed heretofore. In the preferred form, the substrates 42, 44 are titanium and the ceramic coatings 46, 48 which form the bearing surfaces are chromium oxide. The outer bearing surfaces 46, 48 of each member 38, 40 of the inner race 26 are complementary to the annular bearing surfaces 34, 36 of the outer race 22 having spherical curvatures whereby the coengaging surfaces of the inner and outer races cooperate to form a bearing capable of absorbing radial, axial and moment loading individually or in combination.

The members 38, 40 of the split inner race 26 are held in contact with the bearing surfaces 34, 36 of the outer race 22 by means of a cylindrical bushing 24 which, in FIG. 1, has an integral shoulder 50 at one end and a snap-ring or similar locking means 52 on the other end to retain the members on the bushing as will be more fully explained hereinafter. The split inner race is press-fit, bonded or otherwise secured to bushing 24 to prevent relative movement between the bushing and the inner race thereby completing the bearing construction.

As shown in FIG. 1, the spherical curvature of the coengaging surfaces 34, 46 and 36, 48 of the outer and inner races minimizes binding or wedging due to axial thrust displacement by providing reaction forces represented by arrows 54 in a direction opposing the axial thrust displacement. The spherical curvature of the bearing surfaces also enables the bearing to withstand radial loading by providing reaction forces represented by arrows 56 in a direction opposing the radial loading as well as combined axial and radial loading. In addition to optimizing the radial, axial load capacity, the spherical curvature of the bearing surfaces insures the maximum moment stability due to the spacing of the centers for generating the spherical curvatures of the coengaging surfaces along the central axis of the bearing construction beyond the end faces of the bearing construction. It will be recognized however that the centers for generating the spherical curvatures of the coengaging surfaces can be other than along the central axis of the bearing construction, for instance, at a predetermined offset distance from the said central axis. The spherical curvatures of the coengaging surfaces, together with the unique combination of materials utilized to form the self-lubricating bearing, improve the wear life of the bearing and also eliminate any tendency of the bearing to stick-slip during operation or otherwise malfunction during operation.

Figure 2:
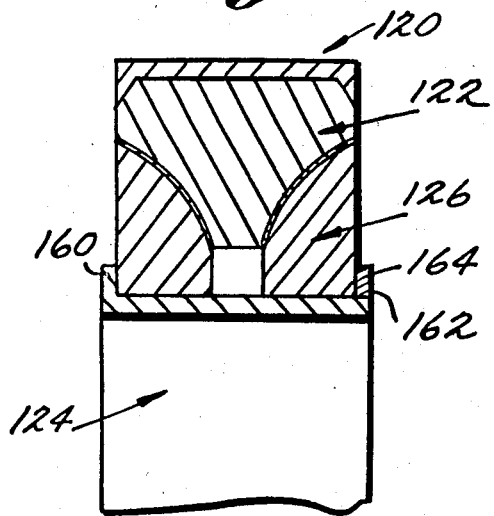
FIG. 2 is a fragmentary sectional view of the upper half of a bearing construction illustrating a second embodiment of the present invention wherein one of the shoulders on the inner race through bushing is formed with an end washer welded to the bushing.

FIG. 2 illustrates a second embodiment of the present invention having an outer race housing 120, an outer race 122 and an inner race 126 identical in construction to the embodiment of FIG. 1 and, therefore, to avoid unnecessary repetition, these components will not be discussed again in detail for the bearing construction of the second embodiment. However, it is to be understood that the detailed description of these components set forth above in the description of the first embodiment applies to the present embodiment.

The inner race through bushing 124 of the second embodiment does differ in construction from bushing 24 of the first embodiment. The inner race through bushing 124 of the embodiment in FIG. 2 comprises a cylindrical bushing having an integral outwardly extending annular flange or shoulder 160 at one end with a portion 162 at the other end of the bushing protruding beyond the end face of the inner race 126 which is press-fit onto the bushing 124 or bonded to the bushing to prevent any relative motion between the bushing 124 and the inner race 126. Shoulder 160 engages one end face of inner race 126, while a washer 164, which is welded (e.g., by an electron beam weld) to the protruding portion 162 of the bushing, forms a second outwardly extending annular flange or shoulder that engages the other end face of the inner race to maintain the the inner race in sliding contact with the outer race. With this embodiment, the end washer 164 can be positioned relative to shoulder 160 to meet special operating requirements such as a desired axial looseness within the bearing and/or a required rotational torque for the assembly. As with the first embodiment, the components of the through bushing are preferably constructed of a steel alloy metal capable of absorbing axial forces generated during the installation of the bearing when it is clamped in place or otherwise mounted for operation.

Figure 3:
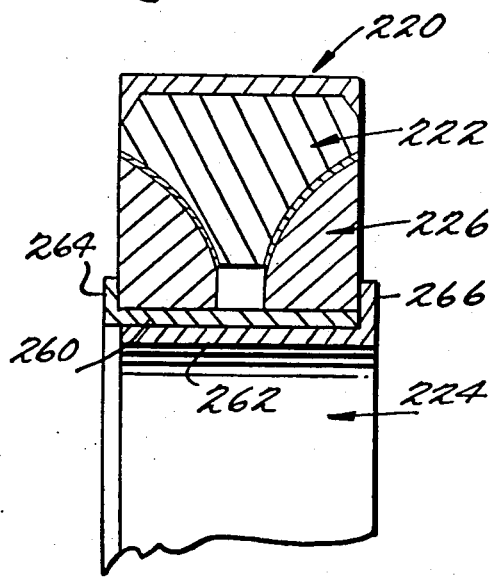
FIG. 3 is a fragmentary sectional view of the upper half of a bearing construction illustrating a third embodiment of the present invention wherein two opposing press-fitted shoulder bushings of substantially equal length are utilized to form the inner race through bushing.

FIG. 3 illustrates a third embodiment of the invention having an outer race housing 220, an outer race 222 and an inner race 226 identical in construction to the embodiment of FIG. 1 and, therefore, to avoid unnecessary repetition, these components will not be discussed again in detail for the bearing construction of the third embodiment. However, it is to be understood that the detailed description of these components set forth above in the description of the first embodiment applies to the present embodiment.

The structure of the inner race through bushing 224 of the third embodiment differs from that of the first embodiment. Bushing 224 comprises two opposing press-fit sleeves 260, 262 each having an outwardly extending annular shoulder 264, 266 at one end. Sleeve 260 is press-fit into the inner race 226 or bonded to the inner race with the shoulder 264 of the sleeve engaging one end face of the inner race, while the other end of the sleeve is substantially flush with the other end face of the inner race. Sleeve 262 in turn is press-fit into sleeve 260 with shoulder 266 extending radially outward from the axial center line of the bearing construction a distance equal to that of shoulder 264, abutting the end of sleeve 260 and engaging the other end face of the inner race. In the preferred form, the length and the wall thickness of the inner sleeve 262 can be such as to provide an edge chamfer of a desired radial thickness and axial length for the bushing 224. However, the third embodiment can also be formed without the chamfered edge of FIG. 3 when required.

Figure 4:
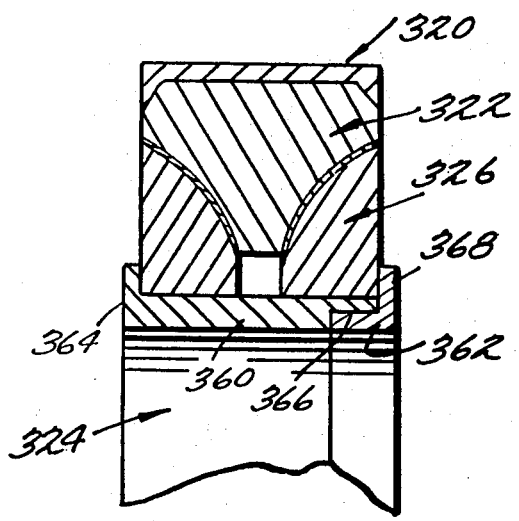
FIG. 4 is a fragmentary sectional view of the upper half of a bearing construction illustrating a fourth embodiment of the present invention utilizing two opposing press-fitted shoulder bushings of unequal length to form the inner race through bushing.

FIG. 4 illustrates a fourth embodiment of the present invention having an outer race housing 320, an outer race 322 and an inner race 326 identical in construction to the embodiment of FIG. 1 and, therefore, to avoid unnecessary repetition these components will not be discussed again in detail for the bearing construction of the fourth embodiment. However, it is to be understood that the detailed description of these components set forth above in the description of the first embodiment applies to the present embodiment.

The inner race through bushing 324 of the fourth embodiment does differ in construction from bushing 24 of the first embodiment. In this embodiment, the inner race through bushing comprises two opposing press-fit sleeves 360, 362 with sleeve 360 being press-fit into or bonded to the inner race 326, extending the entire length of the inner race and having an integral outwardly extending annular shoulder 364 at one end engaging one end face of the inner race. An internal annular groove 366 is provided at the other end of sleeve 360 for receiving sleeve 362 which is press-fit into the groove 366. Sleeve 362 has an annular shoulder 368 at one end extending radially outward a distance substantially equal to that of shoulder 364. Shoulder 368 abuts the end of sleeve 360 and engages the other end face of the inner race 326 to retain the inner race in place and in sliding contact with the outer race 322.

FIG. 5 discloses a fifth embodiment of the present invention having an outer race housing 420, an outer race 422 and an inner race 426 identical in construction with the embodiment illustrated in FIG. 1 and, therefore, to avoid unnecessary repetition these components will not be discussed again in detail for the bearing construction of the fifth embodiment. However, it is to be understood that the detailed description of these components set forth above in the description of the first embodiment applies to the present embodiment.

The inner race through bushing 424 differs in construction from bushing 24 of the first embodiment. Bushing 424 is press-fit into or bonded to the inner race 426 to prevent relative movement between the bushing and the inner race. An annular outwardly extending shoulder 460 at one end of bushing 424 engages one end face of the inner race 426 while the other end of the bushing protrudes beyond the other end face of the inner race. The outer surface of the protruding portion 462 of the bushing is provided with circumferential grooves 464 or is otherwise roughened and a malleable metallic material 466 (such as a malleable cast iron or other ferrous metal) is pressed over the grooved portion of the bushing with the material flowing into the grooves, forming a shoulder which engages the other end face of the inner race 426 and effectively locking the bearing together as a complete operable unit.

FIG. 6 illustrates a sixth embodiment of the present invention which, as illustrated, has an outer race 522, a through bushing 524 and an inner race 526 identical in construction to the embodiment of FIG. 1 and, therefore, to avoid unneccessary repetition these components will not be discussed again in detail for the bearing construction of the sixth embodiment. However, it is to be understood that the detailed description of these components set forth above in the description of the first embodiment applies to the present embodiment.

The sixth embodiment, as illustrated, has no outer race housing. With this construction, the outer race 522 can be fitted into various types of housings, bushings, sleeves or other members if desired or required. While the inner race through bushing 524 illustrated is the same as the inner race through bushing 24 of the first embodiment, it is to be understood that the inner race through bushings of the embodiments illustrated in FIGS. 2 through 5 can also be used with the sixth embodiment where desired or required.

FIG. 7 illustrates the seventh embodiment of the present invention having an outer race housing 620, an inner race through bushing 624 and an inner race 626 identical in construction to the embodiment of FIG. 1 and, therefore, to avoid unnecessary repetition these components will not be discussed again in detail for the bearing construction of the seventh embodiment. However, it is to be understood that the detailed description of these components set forth above in the description of the first embodiment applies to the present embodiment.

The outer race 622 comprises a substrate 660 of a suitable material, such as a metal material, having self-lubricating liners 662 on the annular concave bearing surfaces 664, 666 of spherical curvature. In the preferred form, the liners 662 can be polytetrafluoroethylene fiber-woven fabric reinforced by higher strength yarns or a self-conforming lubricating polymeric material. The fabric or polymeric liners 662 are bonded or otherwise secured to the bearing surfaces 664, 666 of the substrate 660 and provide the dry lubricating medium for the bearing construction. While the embodiment as illustrated, has a bearing construction identical to that of the embodiment of FIG. 1 with the exception of the outer race 622, it is to be understood that the through bushings of the embodiments illustrated in FIGS. 2 through 5 can be substituted for the bushing illustrated in FIG. 7 and, in addition, it is to be understood that the outer race housing can be eliminated as in the embodiment of FIG. 6.

Figure 8:
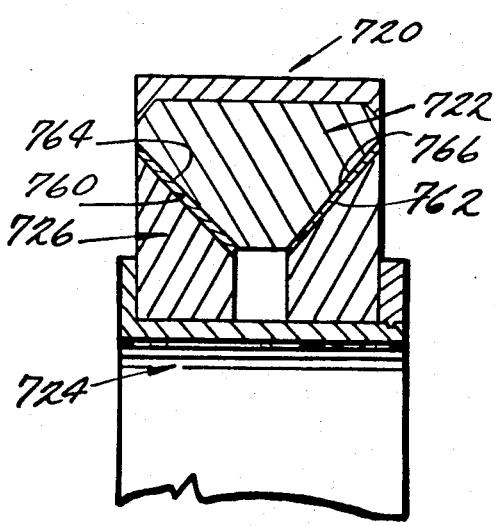
FIG. 8 is a fragmentary sectional view of the upper half of a bearing construction illustrating an eighth embodiment of the present invention wherein the bearing surfaces of the inner and outer races have conical curvatures rather than spherical curvatures.

FIG. 8 illustrates an eighth embodiment of the present invention identical in construction with the embodiment of FIG. 1 with the exception that the coengaging surfaces 760, 762 and 764, 766 of the outer and inner races 722, 726, respectively, have conical curvatures rather than spherical curvatures. Therefore, with the exception of the bearing surface configurations, it is to be understood that the detailed description of the related bearing components 20, 22, 24 and 26 of the embodiment illustrated in FIG. 1 applies to the present embodiment.

Although the through bushing 724 illustrated in FIG. 8 is identical to the through bushing as illustrated in FIG. 1, the through bushings of the embodiments illustrated in FIGS. 2 through 5 can be substituted for the through bushing illustrated in FIG. 8. Also, the outer race housing 720 can be eliminated as with the embodiment illustrated in FIG. 6 and the outer race 622 can be composed of a metal substrate having opposed bearing surfaces lined with a solid-lubricating medium such as polytetrafluoroethylene fiber-woven fabric reinforced by higher strength yarns or a self-conforming lubricating polymeric material.

Figure 9:
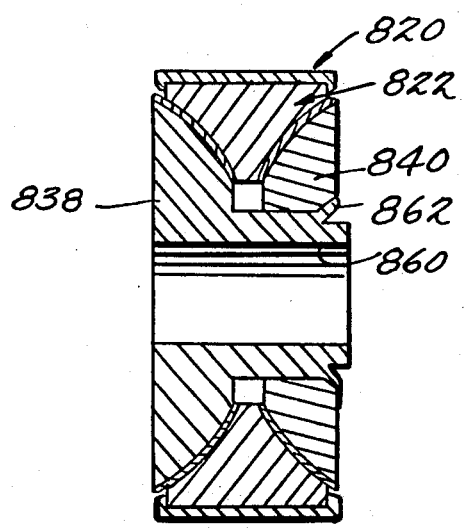
FIG. 9 is a sectional view of a bearing construction illustrating a ninth embodiment of the present invention wherein one of the inner race members includes an integral shoulder for carrying the other inner race member.

FIG. 9 illustrates a ninth embodiment of the present invention which, as illustrated, has an outer race housing 820 and an outer race 822 identical in construction with the embodiment illustrated in FIG. 1 and, therefore, to avoid unnecessary repetition, these components will not be discussed again in detail for the bearing construction of the ninth embodiment. However, it is to be understood that the detailed description of these components set forth in the description of the first embodiment applies to the present embodiment.

In this embodiment, the separate inner race through bushing of previous embodiments is eliminated along with the need for snaprings, washers and the like which are utilized on some of the other embodiments to help maintain bearing surfaces of the inner race in engagement with the bearing surfaces of the outer race. In place of the separate inner race through bushing, one of the inner race members 838 is provided with an integral annular shoulder 860 which projects axially from an inner end of the member entirely through the bearing. The other inner race member 840 is press-fitted onto shoulder 860 and is held in place by upsetting or deforming a portion of the outer surface of the shoulder to provide an annular rib or flange 862 which engages an end face of inner race member 840. It should be noted that with the exception of shoulder 860 and rib 862, the construction of the inner race members 838, 840 is the same as that set forth in the detailed description of the inner race members of FIG. 1.

It should also be noted that the outer race housing can be eliminated as in the embodiment of FIG. 6, that the outer race can be composed of a metal substrate having opposed bearing surfaces lined with a solid-lubricating medium such as polytetrafluoroethylene fiber-woven fabric reinforced by high strength yarns or a self-conforming lubricating polymeric material and that bearing surfaces with conical curvatures can be used rather than the spherical curvature illustrated.

FIG. 10 illustrates a tenth embodiment of the present invention having an outer race housing 920, an inner race through bushing 924 and an inner race 926 identical in construction to the embodiment of FIG. 1 except for the elongation of housing 920 and bushing 924. Therefore, to avoid unnecessary repetition, these components will not be discussed again in detail for the bearing construction of the tenth embodiment. However, it is to be understood that the detailed description of these components set forth above in the description of the first embodiment applies to the present embodiment.

The outer race 922 differs from the outer race of the first embodiment in that rather than being unitary, the outer race is split and comprises two members 960, 962 separated by a metallic tubular spacer or spacing sleeve 964. This construction is designed for use where sleeve bearings are required which can operate under thrust loads without binding. With the exception of the multi-unit outer race which replaces the unitary outer race, the bearing construction, as illustrated, is identical to the construction of FIG. 1. This includes the material used for the outer race and the spherical curvatures of the bearing surfaces of the outer race.

Of course, it should be noted that the through bushings of the embodiments illustrated in FIGS. 2 through 5 and the integral shoulder of the embodiment illustrated in FIG. 9 can be substituted for the through bushing 924 of FIG. 10. Furthermore, the outer race housing 920 can be eliminated as in the embodiment of FIG. 6 and/or the outer race 926 can be composed of a metal substrate having opposed bearing surfaces lined with a solid-lubricating medium such as polytetrafluoroethylene fiber-woven fabric reinforced by high strength yarns or a self-conforming lubricating polymeric material.

FIG. 11 illustrates an eleventh embodiment of the present invention identical in construction with the embodiment of FIG. 1 with the exception that the coengaging bearing surfaces 1060, 1062 and 1064, 1066 of the outer and inner races 1022, 1026 have convex and concave curvatures, respectively. Therefore, with the exception of the bearing surface configurations, it is to be understood that the detailed description of the corresponding bearing components 20, 22, 24 and 26 of the embodiment illustrated in FIG. 1 applies to the present embodiment.

The complementary convex and concave bearing surfaces 1060, 1062 and 1064, 1066 of the outer and inner races 1022, 1026 preferably have curvatures which are generated by radii 1068 extending from an axis 1070 oriented perpendicular to the axis of the bearing and located outside the bearing and for instance outside the bearing intermediate the end faces of the bearing assembly. As shown in longitudinal cross section, the curvature of the surfaces 1060, 1062 and 1064, 1066 is arcuate.

Although the through bushing illustrated in FIG. 11 is identical to the through bushing as illustrated in FIG. 1, the through bushings of the embodiments illustrated in FIGS. 2 through 5 or the integral shoulder of the inner race of the embodiment illustrated in FIG. 9 can be substituted for the through bushing 1024 of FIG. 11. Furthermore, the outer race housing 1022 can be eliminated as in the embodiment of FIG. 6, the outer race can be split as in the embodiment of FIG. 10 and/or the outer race can be composed of a metal substrate having opposed bearing surfaces lined with a solid lubricating medium such as polytetrafluoroethylene fiber-woven fabric reinforced by higher strength yarns or a self-conforming lubricating polymeric material.

While the preferred form of the invention has been shown and described, it is to be understood that all suitable modifications and equivalents may be resorted to which fall within the scope of the invention.

What is claimed is:

1. A self-lubricating bearing assembly comprising, annular outer race means having end faces and inwardly convex annular bearing surfaces intermediate said end faces, said bearing surfaces of said outer race means being made at least in part of a solid lubricant material, split inner race means having opposed concave bearing surfaces complementary in configuration to said bearing surfaces of said outer race with said concave bearing surfaces of said inner race means comprising at least in part a hard material, and means maintaining said bearing surfaces of said split inner race means in sliding contact with said bearing surfaces of said outer race means whereby relative movement between said inner and outer races can take place and the bearing assembly can absorb radial, axial and moment loading.

2. The self-lubricating bearing assembly of claim 1, wherein said solid lubricant material is selected from the group consisting of a carbonaceous material optionally impregnated with a metal selected from the group consisting of antimony and silver and polytetrafluoroethylene and said hard material comprises a metal substrate provided with a ceramic coating wherein said metal substrate is selected from the group consisting of titanium, titanium alloy, ferrous alloy, aluminum and aluminum alloy and said ceramic coating is selected from the group consisting of chromium oxide, titanium dioxide, aluminum oxide, titanium carbide and tungsten carbide, said metal substrate having a tensile strength ranging from 35,000 to 250,000 psi and said ceramic coating having a thickness ranging from 0.0005 to 0.010 inches.

* * * * *